US007709033B2

(12) United States Patent
Kvist et al.

(10) Patent No.: US 7,709,033 B2
(45) Date of Patent: May 4, 2010

(54) PROCESS FOR THE FRACTIONATION OF CEREAL BRANS

(75) Inventors: Sten Kvist, Odakra (SE); Tommie Carlsson, Hoganas (SE); John Mark Lawther, Roskilde (DK); Fernando Bastile DeCastro, Campinas (BR)

(73) Assignee: Biovelop International B.V., Amstelveen (NL)

( * ) Notice: Subject to any disclaimer, the term of this patent is extended or adjusted under 35 U.S.C. 154(b) by 1238 days.

(21) Appl. No.: 10/643,402

(22) Filed: Aug. 19, 2003

(65) Prior Publication Data

US 2005/0089602 A1 Apr. 28, 2005

Related U.S. Application Data

(63) Continuation of application No. PCT/SE02/00309, filed on Feb. 21, 2002.

(30) Foreign Application Priority Data

Feb. 26, 2001 (SE) .................... 0100655-0
Oct. 4, 2001 (SE) .................... 0103328-1

(51) Int. Cl.
*A23L 1/00* (2006.01)
(52) U.S. Cl. .................... 426/49; 426/52; 426/615
(58) Field of Classification Search .................... 426/18, 426/49, 52, 615, 658
See application file for complete search history.

(56) References Cited

U.S. PATENT DOCUMENTS

| 3,879,373 | A | | 4/1975 | Gerrish, Sr. et al. | |
|---|---|---|---|---|---|
| 4,171,383 | A | | 10/1979 | Chwalek et al. | |
| 4,171,384 | A | | 10/1979 | Chwalek et al. | |
| 4,361,651 | A | | 11/1982 | Keim | |
| 4,435,429 | A | * | 3/1984 | Burrows et al. | ................ 426/18 |
| 4,746,073 | A | | 5/1988 | Stone et al. | |
| 4,927,649 | A | | 5/1990 | Antenucci | |
| 5,013,561 | A | * | 5/1991 | Goering et al. | ................ 426/28 |
| 5,308,618 | A | | 5/1994 | Konno et al. | |
| 5,312,636 | A | | 5/1994 | Myllymaki et al. | |
| 5,622,738 | A | | 4/1997 | Takeuchi et al. | |
| 7,005,155 | B2 | * | 2/2006 | Bjurenvall | ................ 426/618 |

FOREIGN PATENT DOCUMENTS

| JP | 04-071466 | 3/1992 |
|---|---|---|
| JP | 11-113600 | 4/1999 |
| WO | WO9831713 A1 | 7/1998 |
| WO | WO0160180 A1 | 8/2001 |

OTHER PUBLICATIONS

Hernandez, M.E. et al. Enzymatic Treatment of Rice Bran to Improve Processing. JAOCS, vol. 77, No. 2 (2000).
Wood, Peter J., Editor. Oat Bran. American Assoc. Of Cereal Chemists, Inc. St. Paul, MN 1993.
Luh, Bor S. Rice: Production and Utilization. AVI Publishing Co, Inc. Wesport, CT. 1980.
Shih, F.F. et al. Use of enzymes in the processing of protein products from rice bran and rice flour. Nahrung 43 (1999).

* cited by examiner

*Primary Examiner*—Leslie Wong
(74) *Attorney, Agent, or Firm*—Gauthier & Connors LLP

(57) ABSTRACT

A process for the fractionation of valuable fractions from cereal brans (e.g. wheat, barley and oat brans, and rice polish) is described. In particular, this invention describes a two step process, in which the said bran is first subjected to a combination of enzymatic treatment and wet milling, followed by sequential centrifugation and ultrafiltration, which aims at physically separating the main bran factions, i.e. insoluble phase (pericarp and aleurone layer), germ-rich fraction, residual endosperm fraction and soluble sugars. A second step consists of fractionating cereal brans substantially free of soluble compounds, hence insoluble phase from the above-mentioned first step, by enzymatic treatment with xylanases and/or beta-glucanase and wet milling, followed by sequential centrifugation and ultrafiltration, which aims at physically separating the main fractions, i.e. insoluble phase (remaining cell wall components), protein-rich fraction, soluble hemicellulose and oligosaccharide, and therefore maximizes the extraction rate of valuable cell wall components and aleurone cells from previously cleaned bran.

13 Claims, 2 Drawing Sheets

PROCESS FOR THE FRACTIONATION OF CEREAL BRANS

This is a continuation of copending application(s) International Application PCT/SE02/00309 filed on 21 Feb. 2002 and which designated the U.S.

TECHNICAL FIELD

The present invention relates to process for the extraction of soluble proteins, non-starch carbohydrates, and optionally oils from commercially available cereal bran. It also allows the production of cell wall-derived materials and less accessible proteins from cereal brans that are substantially free of soluble compounds, the compounds thus recovered as well as their use.

BACKGROUND OF THE INVENTION

Bran is defined as the seed coat of cereal grains such as wheat, barley, rye, triticale, oat or rice. Anatomically, bran comprises the outer layers of the seed, known as the pericarp-testa and an inner layer known as the aleurone layer, which is often classified as the outermost layer of the endosperm. However, from the practical point of view cereal bran is herein defined as the remaining material after the conventional milling or polishing of cereal grains and contains primarily pericarp-testa and aleurone layer components, along with the cereal germ and residual parts of the endosperm. The relative amounts of each component will depend upon the type of cereal and milling technique applied.

Within this definition, bran therefore contains all of the pericarp-testa components, the aleurone layer, the germ components including germ proteins and oils, along with a residual amount of endosperm starch, gluten and pentosans.

U.S. Pat. No. 4,361,651 describes a process for making fermentable sugars and high protein products from grain, mainly maize. In this method, grain is steeped for 10-30 h, prior to milling and separation of the germ component, saccharification of carbohydrates (mainly starch), and separation of fibre. The yield of starch is maximised for fermentation to alcohol. Within the described process there is no specific fractionation of the bran component, separation of protein types or consideration of the germ component.

U.S. Pat. No. 5,312,636 discloses a process for fractionating crop into industrial raw material. This is focused on oat grain and incorporates bran fractionation procedures that involve the extraction of more hydrophobic components such as lipids in polar organic solvents prior to the alkaline extraction of residual bran to produce beta-glucan, protein and degummed fibres. The use of the organic solvent is a key step in the process and hydrolysing enzymes are not utilised during the fractionation procedure.

Two related US patents (U.S. Pat. Nos. 4,171,383 and 4,171,384) disclose dry and wet milling procedures for refining whole wheat grain. U.S. Pat. No. 4,171,383 focuses on wet milling of the whole kernel. The bran produced is mixed with a separated (mainly) endosperm protein fraction to produce animal feed. U.S. Pat. No. 4,171,384 describes dry milling of the whole kernel to produce an endosperm fraction, a germ fraction and a bran fraction. The endosperm fraction is then subjected to wet milling and separation of starch-rich and protein-rich fractions. The protein rich fraction is added to the bran to produce an animal feed. There is no description of a specific wet fractionation of the bran itself within either patent.

Patent application WO 99/11672 discloses a process that uses selective enzymes, such as acetyl xylan esterase and ferulic acid esterase, to both facilitate the removal of hemicellulose from various plant materials and alter its degree of phenolic ester substitution. Despite the fact that functional hemicellulose with high solubility and gelling strength can be produced yields are rather low. In fact, the inventors reported a 3 and 6% yield of arabinoxylan ferulate (hemicellulose), when wheat bran was treated with acetyl xylan esterase for 90 and 180 min, respectively. Furthermore, the invention does not make any reference to the use of xylanases, or its combination with wet milling in order to overcome the low yields reported.

U.S. Pat. No. 5,308,618 discloses a process to extract soluble dietary fibre hemicelluloses from wheat bran by applying a heat pre-treatment in aqueous solution. Further processing such as filtration, salting out, dialysis, ultrafiltration, reverse osmosis, gel filtration and precipitation in order to remove contaminants from the hemicellulose fraction, follows this. The inventors make no claims with regards to the use of enzymes and production of products streams other than hemicellulose. Furthermore, the invention highlights the need of run costly procedures to remove contaminants, which were once present in the original wheat bran. The bran is extracted at high temperatures and pressures in water (180-200° C.), producing a glucose rich dietary fibre component in the water phase. The process specifically targets the production of dietary fibre and is not really/strictly a fractionation procedure in that other products is largely ignored.

U.S. Pat. No. 3,879,373 discloses a process to extract hemicelluloses from wheat bran by applying alkali treatment to dissolve hemicelluloses and other bran components followed by ethanol extraction to separate the hemicelluloses. Alkali (sodium hydroxide) extraction of hemicellulose has also been disclosed in U.S. Pat. No. 5,174,998 as an intermediate step to produce controlled-release compositions containing the said alkali-extracted hemicellulose and an active substance. Similar alkali-extraction procedure is disclosed in U.S. Pat. No. 4,927,649 to produce hemicellulose, which is then used in coating compositions containing insoluble dietary fibre.

WO 00/04053 patent application describes a chemical process using alkaline peroxide treatment to produce high yields of light coloured gelling hemicelluloses from products derived from flour, husk or bran. Another chemical extraction process of hemicellulose from wheat bran has been disclosed in WO98/31713 patent application, whereby the inventors combine a washing procedure to remove the starch fraction followed by an alkaline treatment with sodium hydroxide to extract the hemicellulose from the starch-free raw material.

It appears from above-described prior art on alkali extraction of hemicellulose that this is an old, proven and effective way to yield high quantities of soluble hemicellulose with interesting functionalities such as gelling, dietary fibre and as an inert material for controlled-release compositions. The drawback of such technology is the associated problems of utilising chemicals. Firstly, chemicals eventually become contaminants in various product streams, and therefore require additional purification. This normally has significant cost implications. Secondly, innovative industrial processes based on chemical extraction are not always attractive from the marketing point of view, particularly in food applications.

Production of insoluble dietary fibres from oats is disclosed in U.S. Pat. No. 5,023,103, which describes a chemical procedure (alkali and bleaching treatment) for the production of insoluble dietary fibre with high water holding capacity and non-gritty mouth feel. A water holding capacity of 6.9 g watering oat fibre has been reported.

Other references have disclosed processes for the extraction of proteins from cereal brans. U.S. Pat. No. 4,746,073 discloses a physical process to separate aleurone cell particles and pericarp-testa particles from commercial wheat bran. The process consists of milling the bran particles to a specific particle size distribution, electrostatically charge the said particles and then pass the said charged particles through a magnetic field, which separates aleurone from pericarp-testa particles. The separation is achieved by hammer-milling the bran and then subjecting the resultant particles to a physical separation regime achieve the separation. No aqueous wet processing is employed during the fractionation procedure described therein.

This is a rather different concept from the current invention, which is based upon the use of enzymes and aqueous wet milling.

Waszczynskyj et al. (1981) have proven that protein extraction rate of alkali-treated full fat wheat bran can be increased from 30% up to 38.5% when it is preceded by polysaccharidase treatment. The above-mentioned figures are significantly lower than those described in the present invention whereby up to 60% protein extraction rates were achieved without using alkali treatment. Furthermore, U.S. Pat. No. 5,622,738 discloses a method to extract soluble hemicelluloses, for use as a source of dietary fibre, from various fibrous materials including cereal brans using alkali digestion followed by xylanase treatment. As in other prior art, Waszczynskyj et al made use of alkali digestion to improve extraction rates. Additionally, the residence time for the enzymatic treatment was rather long (3 to 96 h), which makes the process not very attractive from a production cost point of view.

WO 01/60180 relates to process for separating oil from rice bran, whereby bran having a suitable particle size in a slurry is subjected to an enzymatic treatment, and subjecting the enzymatically treated slurry for a separation to recover an oil phase for further isolation of specific lipids. The process is carried out under alkaline conditions for a considerable time period, normally 15 hours. As no degradation of starch present, about 15% of the ingoing bran, takes place, any end product will be heavily contaminated with starch.

It is clear that the above-mentioned prior art has not succeeded to arrive at a process of cereal bran fractionation, which is both chemical-free and yields different food-grade fractions and simultaneously yield aleurone proteins, oligosaccharides and hemicelluloses, and yet produce insoluble dietary fibre from previously cleaned cereal bran, i.e. substantially free of soluble components, using xylanases and/or beta-glucanases in combination with wet milling.

SUMMARY OF THE PRESENT INVENTION

The main objectives of the present invention are to:
1. Arrive at an efficient and cost effective industrial wet process to extract and yield germ-, endosperm- and aleurone-rich fractions, glucose, soluble hemicellulose, soluble oligosaccharides, insoluble fibre, and optionally oils from cereal bran.
2. Combine the use of enzymatic treatment with wet milling to improve the efficiency of extraction and separation in an industrial process.
3. Ensure that in the fractionation process protein fractions of distinct physical properties and therefore functionalities were obtained.
4. Ensure that the intermediate fibre raw material contains the least amount of readily extractable components, hence solubles, so that contamination with the said solubles in the end products is kept to a minimum.
5. The process is carried out in such a way so that use of chemical extraction procedures are avoided and that, preferably food grade and non-genetically modified (non-GMO), xylanases and/or beta-glucanases are used in order to broaden the market opportunities for the end products.

In this description, the term cereal bran substantially free of soluble compounds or "cleaned bran" refers to any cereal bran, which has been processed, after conventional milling or polishing, by any means, so as to remove substantial amounts of soluble components, which are extracted by water or less polar solvents. The resulting material, hereafter referred to as cleaned bran, should contain rather limited amounts of soluble sugars, starch and gluten (less than 1%), but it may still contain some proteins and fats, which are less accessible and/or soluble. The cleaned bran consists primarily of cell wall components, of which hemicellulose is the most abundant.

The invention relates to methods, procedures and an industrial process for the wet-fractionation of cereal bran into two protein rich fractions, one of which contains the germ oils and related components, a fibre fraction, which also retains most of the aleurone proteins, and a sugar syrup fraction.

The invention is centred around the wet-milling of cereal bran in the presence of enzymes: a) starch degrading enzymes of the group amylases, and amyloglucosidases, and optionally b) non-starch degrading enzymes (polysaccharidases) and optionally a phytase, under appropriate conditions of temperature, i.e. from 50 to 90° C., more preferably from 50 to 75° C., and pH from 4 to 7.5. This is followed by the separation of the above listed components from aqueous suspension using mainly centrifugal separation methods. The pH when using an alpha amylase is normally around 7, and when using an amyloglucosidase it is around 4.5. The enzymes are used normally in a cocktail comprising 200 to 1500 IU/g of substrate, but should contain at least 1 IU/g of substrate.

This invention also relates to methods, procedures and an industrial process for the wet-fractionation of cleaned bran into one protein rich fraction, which contains primarily proteins from the aleurone cells, a soluble hemicellulose fraction, a soluble oligosaccharide fraction and an insoluble fibre fraction.

This invention further aims at the fractionation of cleaned bran by combining wet-milling and enzymatic hydrolysis specifically with food grade xylanases and/or beta-glucanase under well-controlled conditions of temperature, such as i.e. from 35 to 80° C., more preferably from 40 to 50° C., and pH from 4 to 7, preferably 4.5 to 5.5.

Nowhere during the degradation of the bran and bran components pH exceeds 7.5 as alkaline hydrolysis seems to have a detrimental effect on the fractionation and the end products.

A further effect of the present invention is that the end products will contain no, or substantially no starch, starch derivates, or starch fragments due to the primary hydrolysis using a starch hydrolysing enzyme treatment.

This step is followed by the separation of insoluble fibre and protein fractions from aqueous suspension using centrifugal separation methods while both hemicellulose and oligosaccharide fractions are separated by size exclusion techniques such as ultrafiltration.

Presently there exist no commercial enzyme-based methods for wet-fractionating of cereal bran, which is capable of extracting the above-mentioned fractions.

DETAILED DESCRIPTION OF THE PRESENT INVENTION

Figure 1:
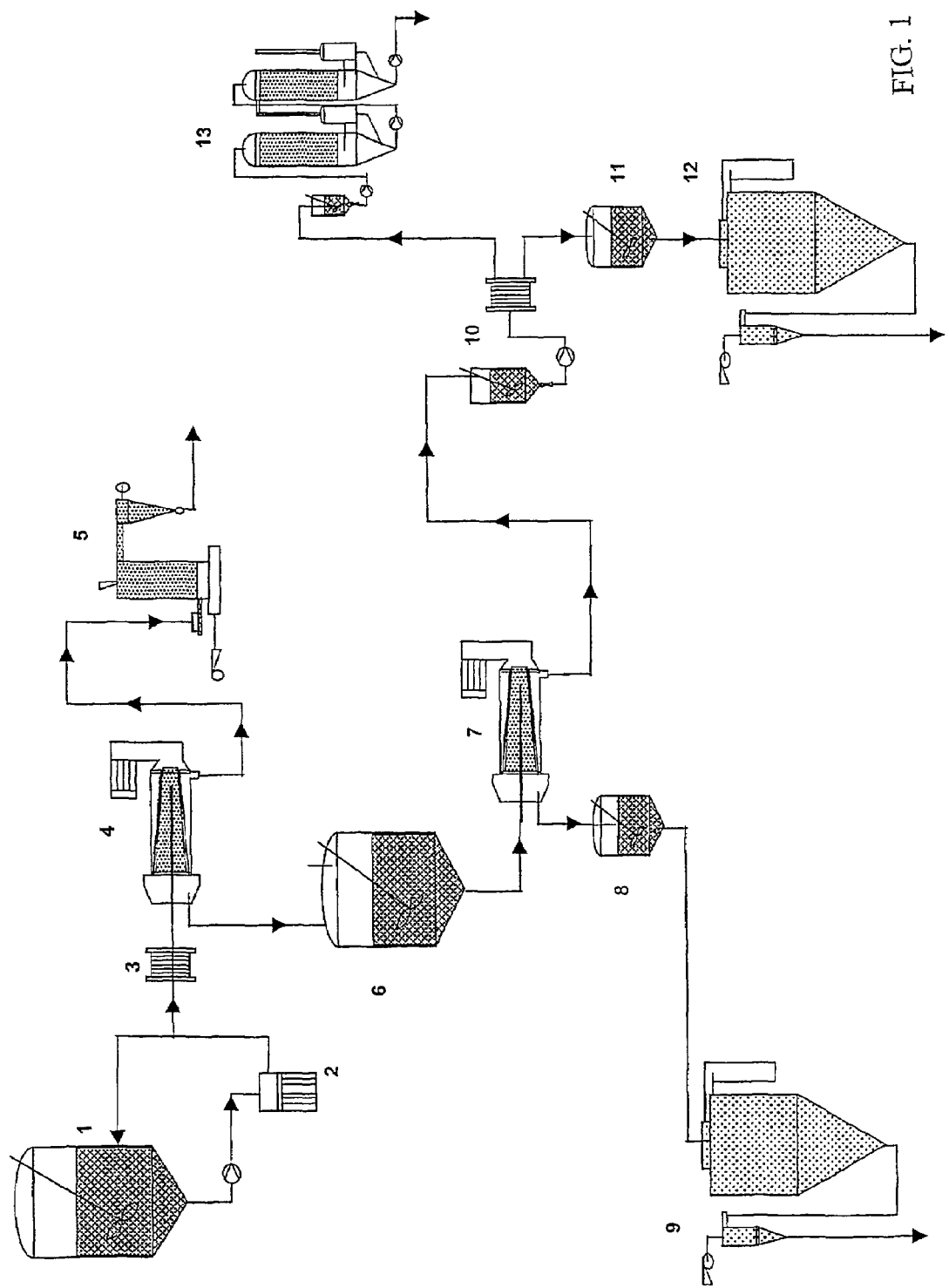
FIG. 1 shows a set-up for carrying out a preferred embodiment of the invention.

It has now surprisingly been shown possible to solve the problems identified above and meet the objectives by means of the present invention which is characterized in that bran is first subjected to a combination of enzymatic treatment with enzymes of the group starch- and optionally phytate-hydrolysing enzymes, and aqueous wet milling, followed by an optional step of enzyme inactivation by wet heat treatment, and a subsequent step whereby the insoluble phase containing a cleaned bran consisting of both pericarp and aleurone fractions are separated by centrifugal forces into an aqueous phase containing a germ-rich fraction and an aqueous phase containing residual endosperm components, and that the proteins contained in the endosperm-rich fraction are concentrated.

In a preferred embodiment cereal brans are the fibrous-residue resulting from a primary grain milling, i.e. after the separation of the endosperm fraction, of wheat, rice, barley, oat, rye and triticale, and having variable chemical compositions, presence of anti-nutritive factors, and presence of various anatomical fractions, i.e. pericarp, germ, and residual endosperm.

In a preferred embodiment the enzymatic treatment is accomplished using a starch degrading enzyme in the form of a polysaccharidase of amylases and/or amyloglucosidases.

In a preferred embodiment a further enzymatic treatment is carried out using at least one non-starch degradable polysaccharidase in the form of cellulases, hemicellulases mainly xylanases, beta-glucanases, and pectinases, and/or phytases.

In a preferred embodiment such cleaned bran is subjected to a combination of enzymatic treatment with specific enzymes of the group xylanase and/or beta-glucanase under strictly controlled hydrolysis conditions, and intermittent wet milling, followed by an optional step of enzyme inactivation by wet heat treatment.

In a preferred embodiment the inactivated hydrolysate is then fractionated by centrifugal forces into an insoluble phase containing primarily cellulose, lignin, less accessible hemicellulose, residual aleurone cells and cell wall bound proteins, and an aqueous phase containing soluble hemicellulose, oligosaccharides, sugars and proteins, and that the aqueous phase is further separated by centrifugal force into protein-rich fraction and a carbohydrate-rich fraction, and that the carbohydrate-rich fraction is further separated by size exclusion technique into a hemicellulose-rich fraction (medium molecular size) and an oligosaccharide-rich fraction (small molecular size).

In a preferred embodiment cereal bran substantially free of both in water or less polar solvents soluble compounds are derived from wheat, rice, barley, oat, rye or triticale.

In a preferred embodiment the combination of intermittent wet milling with enzymatic treatment is arranged to increase substrate accessibility to the cell wall degrading enzymes thereby improving the overall hydrolysis performance and the subsequent separation of the various fractions by density/solubility and molecular size.

In a preferred embodiment the enzymatic treatment is carried out using at least one non-starch degradable polysaccharidase in the form of cellulases, hemicellulases mainly xylanases, beta-glucanases, and pectinases, and optionally phytases.

In a preferred embodiment the enzymatic treatment is accomplished by using xylanases with high beta 1-4-xylanase (pentosanase) and/or beta-glucanase activity.

In a preferred embodiment the said fraction contains at least 35% protein and 10% oil on dry matter basis and exhibits a high emulsifying capacity and an increased shelf life with regards to resistance to oxidation compared to the original bran, and that the said fraction contains less than 5% fibre.

In a preferred embodiment the said fraction contains at least 25% protein and 10% sugar and less than 3% oil and 3% fibre, and at least 25% soluble high-molecular weight non-starch polysaccharides of the groups beta-glucans for barley and oat and arabinoxylans for wheat, rice, rye and triticale.

In a preferred embodiment liquid whey is incorporated in to the said fraction at levels varying from 20 to 80% by weight on dry matter basis, and that the final mixture is dried.

A further aspect of the invention comprises an insoluble fibre fraction produced wherein the said fraction consists of cell wall components of bran (>85%) and aleurone proteins (>10%), and substantially free of gluten and starch, and with a high water holding capacity (>6 g water/g dry product).

A still further aspect of the invention encompasses a sugar fraction wherein the said fraction is originated primarily from the residual endosperm and it contains more than 65% sugars (such as glucose, maltose and maltotriose) on dry matter basis.

A further aspect of the invention encompasses a protein fraction derived substantially from the aleurone cells, wherein the said fraction contains at least 35% protein and 10% oil, less than 5% insoluble fibre on dry matter basis, substantially free of gluten and starch and with a high emulsifying capacity.

A still further aspect of the invention encompasses an insoluble fibre fraction, wherein the said fraction consists primarily of cell wall components with a relative lower hemicellulose content compared to the original cleaned cereal bran, substantially free of gluten and starch (<1% on dry matter basis) and with a high water holding capacity (>6 g watering dry product).

A further aspect of the invention relates to a soluble hemicellulose fraction, wherein the said fraction consists primarily of medium molecular weight hemicellulose preferably above 20 kDa (>40%) of the groups arabinoxylans from wheat, rye, rice and triticale, and beta-glucans from oat and barley, which also contains proteins (<10%) and monosaccharides (<10%), and is substantially free of gluten and starch (<1% on dry matter basis).

A still further aspect of the invention relates to a soluble oligosaccharide fraction, wherein the said fraction consists primarily of low molecular weight hemicellulose sub-units of below about 20 kDa (>40%) of the groups arabinoxylans from wheat, rye, rice and triticale, and beta-glucans from oat and barley, which also contains proteins (<10%), monosaccharides (<20%), lignans and related phenolics (<5%), and is substantially free of gluten and starch (<1% on dry matter basis).

A further aspect of the invention relates to a protein fraction, wherein the oil can be optionally removed by conventional organic solvent extraction or preferably by supercritical carbon dioxide extraction to yield an oil fraction and a defatted protein fraction.

A still further aspect of the invention relates to a protein fraction, wherein the oil can be optionally removed by conventional organic solvent extraction or preferably by supercritical carbon dioxide extraction to yield an oil fraction and a defatted protein fraction.

A further aspect of the invention relates to an insoluble dietary fibre used for recovery of cellulose, hemicellulose, lignin and lignans.

A still further aspect of the invention relates to a germ containing sterols known to reduce the uptake of cholesterol in humans and intact vitamin E complex, sterols, lecithins, phospholipids and glycolipids.

A further aspect of the invention relates to a defatted germ rich protein produced in accordance with the invention.

A still further aspect of the invention relates to an aleurone-rich oil produced in accordance with the invention.

A further aspect of the invention relates to a defatted aleurone-rich protein produced.

A still further aspect of the invention relates to a protein fraction, wherein proteases are incorporated in to the said fraction in wet state and at controlled temperature and pH conditions, and the resulting protein hydrolysate has enhanced functionalities such as solubility, emulsifying and foaming capacities.

A further aspect of the invention relates to a use of a protein fraction, as described in feed and food applications to replace other protein products from vegetable and animal sources.

A still further aspect of the invention relates to a use of a protein fraction, as described, in food application as a texturizer, emulsifier, fat binder and fat replacer.

A further aspect of the invention relates to a use of a protein fraction, as described, as a raw material for the extraction of soluble high-molecular weight non-starch polysaccharides.

A still further aspect of the invention relates to a use of a protein fraction, as described, in food applications as a foam stabilising agent, whipping agent, water binder, gelling agent, and as a dietary supplement rich in soluble dietary fibre (beta-glucans and arabinoxylans) with associated health benefits such as cholesterol-reducing effects of the beta-glucans.

A further aspect of the invention relates to a use of a protein fraction, as described, as an additive or ingredient in foods such as baked products, processed meats, dairy products, soups and sauces, high protein drinks and health drinks.

A still further aspect of the invention relates to a use of a fibre fraction, as described, in feed and food applications to replace other insoluble fibrous products as a texturizing and water binding additive in processed foods particularly meat products, and as a source of dietary fibre in breakfast cereals, baked products and health products, or as a raw material for further processing to extract remaining cellulose, hemicellulose, lignin and lignans.

A further aspect of the invention relates to a use of a soluble hemicellulose, as described, in feed and food applications as a gellant, thickener, foam stabilizer, emulsifier, water binder, and as a dietary supplement rich in soluble dietary fibre, and in chemical applications, or as a raw material for further processing to obtain other functional hemicelluloses.

A still further aspect of the invention relates to a use of a soluble hemicellulose, as described, as an additive or ingredient in foods such as baked products, processed meats, dairy products, soups and sauces, high protein drinks and health drinks.

A further aspect of the invention relates to a use of a soluble oligosaccharide, as described, in feed and food applications as a functional soluble dietary fibre or low calorie sweetener, or as a raw material for further processing to extract lignans and associated phenolics such as ferulic acid, or as a feedstock for industrial fermentation.

A still further aspect of the invention relates to a use of a soluble oligosaccharide, as described, in confectionery formulations in combination with glucose or other sugar syrups and further concentrated to produce moisture stable products.

A further aspect of the invention encompasses use of a soluble oligosaccharide, as described in claim 19, in food and biomedical applications as a combined source of lignans and fermentable oligosaccharides for the conversion of lignans into active cancer-reducing agents such as enterolactones.

A still further aspect of the invention relates to a use of a sugar fraction, as described, in feed, food and industrial fermentation applications as an energy source, flavouring agent and binding agent.

A further aspect of the invention relates to a set up for carrying out the process, wherein it comprises a hydrolysis vessel, a wet mill, a heat exchange for enzymatic inactivation, decanters, a holding tank, an ultra-filter, and optionally at least an evaporator, and dryers.

A still further aspect of the invention relates to a set up for carrying out the process, wherein it comprises a hydrolysis vessels, a wet mill, a heat exchange for enzymatic inactivation, decanters, a holding tank, an ultra-filter, and optionally evaporators, and dryers.

In a further embodiment of the process of the invention, the enzymatic treatment is carried out at a pH of 4 to 7.5 and at a temperature of from 50 to 90° C., at an enzymatic activity of 200 to 1500 IU/g of substrate.

In a further embodiment of the process the enzymatic treatment is carried out at a pH of 4 to 7, preferably 4.5-5.5, and at a temperature of from 35 to 80° C., at an enzymatic activity of at least 1 IU/g of substrate, preferably 200 to 1500 IU/g of substrate.

DESCRIPTION OF THE PREFERRED EMBODIMENTS

It is widely known and accepted that when cereals are milled with the purpose of producing flour the most nutritious part of the grain is diverted into the by-product, i.e. cereal bran. Despite the fact that cereal brans are rich in proteins, oils, vitamins and minerals its use in the food industry and high value feed industry is rather limited.

There is now developed an industrial process, which makes possible the separation of fractions of different nature from various cereal bran, produce high value protein, soluble non-starch carbohydrates, and optionally oil fractions, and extract virtually all insoluble fibre as a separate fraction. The resulting low-fibre protein and sugar fractions as well as the insoluble fibre fraction have much broader market applications and greater value than the original bran.

Various methods of extraction and fractionation of hemicelluloses from cereal brans have been developed in the past. Equally, various methods for the extraction of valuable proteins and insoluble dietary fibre from cereal brans have been disclosed. The problem is that when one combines the use of commercial cereal brans, which contain large quantities of soluble components such as starch, soluble proteins, pentosans, oils, etc, and a simple extraction process such solubles eventually become contaminants of the main product streams, and therefore have to be removed. This is a costly procedure and in many cases jeopardizes the market value of the non-hemicellulose components.

By utilising previously cleaned bran as the preferred raw material, the inventors have overcome many important production constraints and created interesting opportunities to extract and separate new components from cereal brans. Furthermore, the inventors have developed a simple method in which wet milling is combined with enzymatic treatment using food grade commercial xylanases and/or beta-glucanases, and cheap industrial separation processes.

Essentially, this invention allows one to economically produce fractions derived substantially from the germ, endosperm and aleurone cells, hemicellulose, oligosaccharide and insoluble dietary fibre.

EXAMPLE 1

Wheat bran produced from short milling (SMB) and conventional milling (CMB) processes were used in this trial. Bran sample of 25 kg was transferred to a mixing tank and sequentially hydrolysed at temperatures varying from 70° C. at the first stage with α-amylase to 60° C. in the second stage with amyloglucosidase for a total hydrolysis time of 3 h. During this period the reaction mixture was intermittently wet milled to increase in surface area and dispersion of soluble components. The pH of the reaction mixture was set at neutral initially and then decreased down to 4.5 with acetic acid in the second stage. In addition of maximising the enzymatic activity the acidic pH allowed partial solubilization of the phytates present in the bran.

At the end of the enzymatic hydrolysis and wet milling step the enzymes contained in the reaction mixture were inactivated by wet heating through a heat exchange and quickly cooled down to room temperature.

The hydrolysed bran solution was then put through a two-phase decanter to separate the insoluble (fibre and aleurone fractions) from the soluble fraction.

The soluble fraction was fed to a separator so that the heavy phase containing mostly the germ components could be separated from the light phase containing mainly components from the remaining endosperm found in the bran. The light fraction, which was contained high levels of sugar, was processed in an ultrafilter having a 50 kDa membrane in order to separate low molecular weight sugars and a protein fraction.

All soluble protein fractions, i.e. heavy and light phases, were blended together and finally processed through spray drying. The sugar fraction was concentrated by vacuum evaporation at mild temperature (40 to 60° C.) until a 75% sugar concentration was achieved. The fibre fraction was dried in a conventional laboratory oven, but in an industrial process this can be carried out by a number of different dryers, i.e. tumble drier, ring drier, fine grinder, etc.

Average chemical composition of the brans and their respective fractions are shown below in Table 1.

TABLE 1

| Sample | Dry matter | Protein | Oil | Fibre | Ash | NNE*** |
|---|---|---|---|---|---|---|
| CMB* | 90.8 | 15.7 | 4.1 | 45.4 | 5.5 | 29.3 |
| CMB fractions of the process | | | | | | |
| Protein phase | 92.9 | 31.8 | 7.7 | 1.1 | 7.9 | 51.5 |
| Fibre | 92.8 | 13.6 | 3.0 | 76.9 | 4.1 | 2.4 |
| SMB** | 89.1 | 14.3 | 2.3 | 23.7 | 3.2 | 56.5 |
| SMB fractions of the process | | | | | | |
| Protein phase | 93.9 | 27.8 | 1.5 | 0.9 | 3.4 | 66.4 |
| Fibre | 94.3 | 22.5 | 4.1 | 64.8 | 1.6 | 7.0 |

*Conventional milling bran
**Short milling bran
***Non-nitrogen extracts

EXAMPLE 2

Wheat bran produced from conventional milling was subjected to enzymatic treatment and wet milling as described in Example 1. The hydrolysed bran was fractionated using a two-phase decanter into an insoluble (combined fibre and aleurone) and a soluble fraction.

The soluble fraction was fed into a separator for fractionation using centrifugal forces thus producing two phases. The germ-rich phase was washed with water and fed again to the separator to remove the excess solubles. The resulting protein fraction was kept as such or mixed with evaporated liquid whey on a 1:1 ratio (dry matter basis).

The endosperm-rich wheat fraction, which contained high levels of sugar, was processed in to an ultrafilter in order to separate low molecular weight sugars and a protein fraction.

All soluble protein fractions, i.e. germ and endosperm-rich phases and the mixtures with whey, were spray dried separately. The sugar fraction was concentrated by vacuum evaporation at mild temperature (t=60° C.) until 75°Brix was achieved. The fibre fraction was oven dried.

The additional washing carried out on both germ-rich protein and fibre fraction was very effective to decrease the amount of light soluble contaminants from each fraction, and therefore increase the relative content of valuable components.

Compositional data indicates that germ and endosperm-rich protein fractions have a different relative content of protein and oil. Protein and oil content from the former were 48.6 and 18.6%, respectively and those from the latter were 28.7% and 1.5%, respectively. The insoluble phase containing primarily the bran pericarp (fibre) and the aleurone proteins had 86.4% fibre and 12.6% protein. The chemical composition of the germ-rich phase—whey mix was 31.5% protein, 9.8% oil and 37% lactose.

A further important observation was that the spray dried germ-rich fraction containing 18.6% oil was substantially more resistant to oxidation (rancidification) compared to the original wheat bran. The original wheat bran started getting rancid after 3 weeks of storage. Despite the fact that no exogenous anti-oxidants were added to the germ-rich fraction it only started going off after 12 weeks of storage.

EXAMPLE 3

Previous examples illustrate the use of starch-hydrolysing enzymes and wet milling followed by various separation steps in order to yield both protein, sugar and fibre fractions, the latter still containing substantially high amounts of aleurone proteins. It could be of interest for same applications to separate, at least partly, the aleurone proteins from the bran pericarp (fibre) and recover such proteins in the same fraction as the endosperm-rich fraction for instance.

A trial was set up in the same way as described in EXAMPLE 2, except that a cocktail of polysaccharidases containing both high cellulase and xylanase activities was added together with the amyloglucosidases, and let to work for 3 h. Temperature and pH conditions were kept unchanged. The resulting reaction mixture was further treated exactly as described in EXAMPLE 2.

The inclusion of polysaccharidase during the hydrolysis step had a positive effect with regards to aleurone protein extraction and protein recovery as measured by the mass balance and protein content. The protein content in the endosperm-rich fraction increased from 28.7% (without polysaccharidases) to 34.7% (with polysaccharidases) and the overall protein recovery was increased by 35% when polysaccharidase was added.

EXAMPLE 4

The colour of protein ingredients can be of importance particularly in some food and feed applications. Milk products such as caseinates, whey powder and whey protein concentrate has a light colour and soy protein concentrate have a light brown colour. These products are the main ingredients in high value feeds such as calf milk replacer. But, in same food applications such as sausage and hamburger despite the fact the inclusion level is much lower, colour can still play an important role in the product acceptability.

The technical feasibility of bleaching the germ-rich fraction was assessed by two means. 1. Solely alkali and hydrogen peroxide bleaching, and 2. Alkali-free peroxidase and hydrogen peroxide bleaching.

1. 10 (ten) g samples of germ-rich fraction were incubated in 1 L beakers containing 100 ml water. Samples were dispersed with stirring and ca. 0.25 ml NaOH added until pH 12 was reached. Solutions were warmed at 50° C. and 3.5, 5 and 10 ml of 30% $H_2O_2$ were added to different flasks to provide uptake levels 10, 15 and 30% $H_2O_2$ on weight basis of germ-rich fraction. Mixtures were stirred for 1 h and neutralise with acetic acid.

Full bleaching was achieved with 15 and 30% $H_2O_2$. Sample treated with 10% $H_2O_2$ was only partly bleached. All alkali bleached samples became darker with drying.

2. 10 (ten) g sample of germ-rich fraction was incubated in 1 L beaker containing 100 ml water. Samples were dispersed with stirring and ca. 0.25 ml NS 51004 Novozymes peroxidase was added. Solution was warmed at 50° C. and 3.5 of 30% $H_2O_2$ was added to the flask, i.e. 10% $H_2O_2$ on weight basis of germ-rich fraction, and the mixture stirred for 2 hrs.

The peroxidase—hydrogen peroxide bleaching was effective, consumed less chemicals and no darkening of the sample was observed after drying.

EXAMPLE 5

Amongst the various end-uses of the germ-rich fraction of EXAMPLES 1-4 one could describe meat products such as hamburgers, sausages and meatballs. In such end-uses germ-rich fraction could replace meat, soy protein concentrate and isolate, but also milk casein and caseinates, to mention just a few. It is therefore important to test the overall performance of the germ-rich fraction with regards to emulsifying and binding capacity, taste, etc.

A trial set up to test the feasibility of incorporating various germ-rich fractions extracted from wheat bran into a traditional meat ball recipe consisted of meat, garlic, premix and water.

The following spray dried fractions were tested:
Germ-rich fraction extracted from short milling wheat bran—(I)
Germ-rich fraction extracted from conventional milling wheat bran—(II)
1:1 mix of whey and II, on dry matter basis—(III).

Meatball recipes were tested without germ-rich fraction (control recipe) or with 2.5% inclusion of samples I, II or III. Meatballs were analysed for weight loss, taste, texture and colour after frying. The results are described in the table 2 below.

TABLE 2

| Recipe tested | Weight loss after frying (%) | Colour | Texture |
|---|---|---|---|
| Control (meat, garlic, premix and water) | 23.4 | Reference | Reference |
| Control + 2.5% of I | 21.3 | Slightly darker | Slightly tougher |
| Control + 2.5% of II | 20.8 | Similar | Similar |

TABLE 2-continued

| Recipe tested | Weight loss after frying (%) | Colour | Texture |
|---|---|---|---|
| Control + 2.5% of III | 18.0 | Similar | Slightly more tender |

The overall conclusion was that the samples performed well as additives in a meat ball recipe, and were particularly interesting as they all decreased the weight loss after frying.

EXAMPLE 6

Laboratory scale trials were carried out on cleaned wheat bran to test extraction rates using xylanase treatment. The cleaned wheat bran used as a raw material contained less than 1% starch and at least 50% and 70% of the protein and oil, respectively, originally found in the starting material had been removed.

Ten (10) g of cleaned bran were incubated in 150 ml water, the pH adjusted to 5.5 with acetic acid and an enzyme cocktail containing pentosanase and hemicellulase activities was added at the following concentrations: 0 (control), 0.1, 0.25, 0.5, 1 and 2% (w/w basis). Reaction mixtures were kept at 40° C. for 120 min. The treatment was terminated by inactivating the enzymes at 80° C. for 30 min.

Results indicated relatively high extraction rates compared to the control treatment (no enzyme added) despite the amount of enzyme used. Extraction rates of 3.1, 32.0, 32.8, 33.1, 33.8 and 34.2%, respectively, were obtained from control, 0.1, 0.25, 0.5, 1 and 2% treatments, respectively.

EXAMPLE 7

A similar trial to that described above was carried out with a purified endo 1,4-beta xylanase (pentosanase) at two levels of inclusion: 0.25 and 0.5% (w/w basis).

Extraction rates were also high, and increased from 3.1 (control treatment—no enzyme) to 28.6 and 26.1%, when 0.25 and 0.5% pentosanases were added, respectively.

EXAMPLE 8

Cleaned bran with the same specification as described in Examples 6 and 7 was used in a large-scale trial. The objective was to validate a process using standard industrial equipments, quantify process parameters, determine extraction rates of the various fractions, and ultimately characterize the end products.

Cleaned bran (80 kg) was incubated in hydrolysis tanks containing 500 L water. The pH was adjusted to 5.5 and a purified endo 1,4-beta xylanase (pentosanase) was added at 0.5% (w/w basis). The reaction mixture was continuously stirred and intermittently wet milled while kept at 40° C. for 90 min. The hydrolysis/wet milling treatment was terminated by heating up the reaction mixture to 90° C. for 2 min in a heat exchange device.

The inactivated hydrolysate was pumped through a commercial two-phase decanter where the insoluble phase (insoluble dietary fibre) was separated from the solubles. The insoluble phase was dried and further milled in a commercial fine grinder using indirect heat.

The solubles were then pumped through another two-phase decanter where a heavy phase (aleurone protein-rich fraction)

was separated from a light phase containing the extracted hemicellulose fraction in the form of both soluble hemicelluloses and oligosaccharides. The protein-rich phase was spray dried.

The hemicellulose fraction was further separated by size exclusion using an ultrafiltration unit whereby the large molecular size fraction (soluble hemicellulose) was separated from the small molecular size fraction (oligosaccharides and sugars). The resulting fractions were further processed by spray drying into a fine powder or alternatively evaporating the excess water until 25% water content was achieved.

The following yields of insoluble dietary fibre, hemicellulose, oligosaccharides and protein-rich fractions were obtained from cleaned wheat bran: 51.0, 26.1, 17.3 and 7.7%, respectively.

EXAMPLE 9

An insoluble fibre fraction extracted according to the procedure described in Example 8 was characterized with focus on its potential use as a source of dietary fibre and texturizer in food applications.

Typical composition was as following: dry matter 95%, cell wall components 75%, protein 11%, soluble sugars 3% (of which at least 75% is glucose), fat 4% and minerals 1.5%.

The water holding capacity (WHC), of primary importance when assessing the usefulness of insoluble dietary fibres, of the above-described product was 8.6 g of water/g sample on dry basis. For comparison purposes the WHC of wheat bran in the range of 3.5 g/g and that of cleaned wheat bran is 7.5 g/g. This indicates the improved water absorption of the fibre after cell wall components have been partly removed. Other commercial dietary fibres extracted from wheat straw and sugar beet have WHC of 6.3 and 7.9 g/g, respectively.

EXAMPLE 10

The protein fraction, which contains substantial amounts of aleurone proteins, produced as described in Example 8, have a very interesting chemical composition, functionality and is an Ideal raw material for further processing.

A typical composition of the protein fraction is: dry matter 98%, protein 40%, sugar 3%, fat 18%, non-sugar carbohydrates 32% and minerals 5%.

In order to determine the effect of protease treatment on the functionalities of the protein fraction, a protein sample was subjected to a mild protease treatment and the samples analysed for dry matter and protein solubility, emulsifying capacity and emulsifying stability.

The results are shown in Table 3, and clearly indicate the possibilities to further improve some important functionalities of the protein fraction.

TABLE 3

| Parameters analysed | Protein fraction | Protein fraction treated with protease |
|---|---|---|
| Dry matter solubility (%) | 19.7 | 38.1 |
| Protein solubility (%) | 18.4 | 55.5 |
| Emulsifying capacity (%) | 52.5 | 90.6 |
| Emulsifying stability (%) | 47.5 | 86.0 |

CHARACTERIZATION & END-USES

Germ-Rich Fraction

The high protein content of the germ-rich fractions makes it an ideal substitute for existing expensive proteins from animal and vegetable origin. Additionally, the germ-rich fraction because of the nature of its protein, the presence of high quality oil, phospholipids and sterols also exhibit interesting functionalities such as emulsification, texture and binding, and health benefits associated with cholesterol control in humans.

One can list, as examples, the following existing products, which can be replaced by the germ-rich fraction in the food industry:

Animal protein: casein and caseinates, plasma protein and egg white Vegetable proteins: soy protein concentrates and isolates, texturized soy, hydrolysed gluten and potato protein.

Generally, the above products can be used as meat extenders and texturizer ingredients in hamburger, sausage, and meat balls production to mention a few. The products can be used as a casein replacer in the production of sausage, spreads, dressings, etc., as well.

In the feed industry, the germ-rich fraction is an ideal ingredient for high value feeds such as calf milk replacer, starter feeds for calves, piglets and chicks, fish feeds and pet food. In food applications it can substantially replace the use of soy proteins (texturized soy, concentrate and isolate), potato protein, hydrolysed gluten, high quality fishmeal, plasma protein, and dry milk products such whey protein concentrate, whey and skimmed milk.

The germ rich protein is of great interest as a functional food ingredient, especially in the case of rye, primarily because it contains rye germ oil.

Endosperm-Rich Fraction

This protein fraction is mainly derived from the residual endosperm proteins in cereal bran. It contains 25-40% protein, much of which is highly soluble. It is also particularly rich in soluble dietary fibre pentosans (>35%), has a high water holding capacity and has a light colour.

The endosperm-rich fraction can be used in the food industry in baked products, processed meats, dairy products, soups and sauces, high protein drinks and health drinks. It is a valuable source of non-starch polysaccharides, which are excellent soluble dietary fibre and water-binding materials. In feed applications, it can partly replace gluten, soy and milk proteins as an ingredient to calf milk replacer, piglet started feed and fish feed.

The emulsifying, water binding and foam stabilising properties are equivalent or better than those of other commercial proteins like caseinates, soy protein concentrate and modified wheat gluten. The endosperm-rich protein is very suitable to be used as an ingredient in milk replacer formulae (both for humans and calves), sauces, mayonnaise, dressings etc.

Because it contains high amounts of pentosans and associated ferulic acid there are extra health and functional benefits. In the cosmetic industry the stabilising, emulsifying and water holding properties are ideal.

A combination of the endosperm rich protein and soluble hemicellulose is interesting in a number of food and biomedical applications, because of the emulsifying effect of the endosperm rich protein and the soluble pentosans and the thickening effects of the soluble hemicellulose.

The endosperm-rich fraction is high in pentosan hemicelluloses, mainly arabinoxylans in rye and wheat, or beta-glucans in the case of oat and barley. The claimed health benefits are therefore as described for arabinoxylans and beta-glucans (see below).

Aleurone-Rich Fraction

This is the protein that is derived primarily from the aleurone cell layer and is both a functional and nutritionally valuable material, rich in essential amino acids.

In the food business it would be used as an emulsifier, foam stabilizer and texturiser. In addition there is high potential as a protein supplement.

Insoluble Fibre Fraction

The insoluble fibre fraction can be used as an interesting source of fibre in food applications. The main end-uses as food would be as a texturizing and water binding additive in processed foods particularly meat products, and as a source of dietary fibre in breakfast cereals, baked products and health products. Specifically the high water binding capacity and beneficial effect on bowel function makes it an interesting product for the biomedical market.

This is the remaining fibre after the soluble components (first step process) and a proportion of hemicellulose (second step process) has been removed from cereal bran. The insoluble fibre fraction is a cleaned cereal fibre containing low levels of phytic acid. Because the fibre has already been partially "digested" enzymatically, many beneficial compounds derived from the cell wall are available to the gut for absorption.

The insoluble fibre has high water binding capacity, i.e. typically 100% higher than that of wheat bran. This provides increased gut transit (digesta flow). The remaining pentosans are more accessible to the gut wall (cholesterol reducing) due to the fractionation process.

Because of the increased availability of lignin type materials and other antioxidants within the fibre, various health benefits can be claimed. Specifically the lignans and polyphenolics from rye are known to mimic estrogens (female hormones), and more recently have been found to help preventing various types of cancers. This has been verified for rye products.

Additionally the insoluble fibre is also a good raw material for the further extraction (enzymatically) of lignins, ferulic acids, lignans etc., which are natural antioxidants and potential anticancer agents. These can be used in many biomedical and "cosmetic pharmaceutical" applications such as lotions, creams and moisturizers. The ferulic acid is an effective UV absorber and as such can be used in a sunscreen.

Insoluble dietary fibres are rich in accessible lignans and residual pentosans/hemicelluloses. Bacteria present in the colon convert plant lignans to mammalian lignan, enterolactone, using hemicelluloses as a fermentation medium. These compounds mimic estrogens and appear to have a tangible, demonstrable effect on the suppression of hormone related cancers, e.g., breast, ovarian and prostrate cancers. Rye insoluble dietary fibre specifically contains the lignans secoisolariciresinol (SECO) and matairesinol (MAT), which are known precursors of enterolactone. The insoluble dietary fibre from wheat also contains these lignans, but the effect is not demonstrated in wheat. It is important to state that in this fraction the lignans are supplied in an accessible form, as the cell wall is already partially enzymatically digested, along with their natural synergistic partners, the arabinoxylan hemicelluloses remaining on the fibre.

Sugar Fraction

This is the glucose produced from enzymatic degradation of residual starch of the bran and is a more pure product compared to molasses. It can be used in feed and food applications as an energy source, flavouring agent and binding agent. Alternatively, it is ideal as a feedstock for industrial fermentation since it produces fewer waste products. Ethanol and citric acid industries are therefore ideal consumers of very large quantities of such a product. The production of single-cell protein for the feed and food markets can also be considered.

Soluble Hemicellulose

This is the major cell wall non-cellulose polysaccharide in cereal bran. It can be produced with a medium to high molecular weight and high solubility (the combination of these two properties is the powerful aspect). Because the product is a pentosan (arabino-xylan) it is low calorie and beneficial for gut health. The product can be produced with or without ferulate side chains or free ferulic acid and other antioxidants and is a free flowing cream powder.

Due to its composition and high water binding capacity it is ideal to use as a thickener, gellant, stabilizer, soluble dietary fibre and fat replacer. A non-gellant form of soluble hemicellulose can also be produced. As a thickener and gellant it is interesting in the food industry as an additive in soups, margarine, deserts, pâtés, sauces etc. As a stabilizer it is a cheaper alternative or modified starch (made from wheat, maize etc), modified cellulose, gums (guar gum and carrageenan gum), alginates (seaweed), gelatin (cheap but problem with BSE) and pectin (fruit peel & sugar beet). Finally, it has a good potential in drinks because it is an excellent source of soluble dietary fibre alongside its stabilizing properties.

It is possible to supply the pentosan with ferulate side chains, and in this form the substance will gel in combination with oxygen and enzyme. As such it is an interesting material, for example, for wound dressings as it will keep the skin in a hydrated state and therapeutic agents can be added.

From rye and wheat, this is almost exclusively arabinoxylan (pentosan) hemicellulose. This is readily fermented in the colon, is low calorie to the human and is reported to generate butyrate as a short chain fatty acid (SCFA) end product after fermentation. This is the most "healthy" SCFA according to recent studies as it is a preferred source of energy to epithelial cells lining the colon. The health benefits of adding an enriched, available source of arabinoxylan to the diet may therefore be far-reaching.

This fraction is a perfect soluble dietary fibre, with all of the concomitant health benefits. Arabinoxylans are also thought to be excellent binding sites for secondary bile acids, as a consequence of the rigidity of parts of the molecular chain and the occurrence of relatively hydrophobic domains on the polymer. This is thought to reduce any potential carcinogenic effects. In addition, this fraction contains ferulic ester side chains to a proportion of the polymer, with concomitant free radical stabilising and anti-oxidant properties.

It is important to emphasise that the arabinoxylan concentrated in this fraction is not normally available to the gut and colon if presented as a part of a normal diet or even from conventional bran.

In oat and barley, this fraction is rich in beta-glucan with all of the documented beneficial effects of this polysaccharide. There is a tangible benefit in supplying a concentrated beta-glucan of this nature as the normal ingestion of oats does not supply sufficient material for the full effects to be realised. Purified beta-glucan can be purchased but is very expensive because of the extensive purification regime. It is important to realise that this high purification is required to remove the chemicals utilised in the extraction process. It is suspected that natural synergistic partner compounds are removed in such a process, whilst these materials should still be present in the present process fraction.

Oligosaccharide Syrup

This is derived from the hemicellulose fraction and is a 100% soluble dietary fibre of low molecular weight and low viscosity. The oligosaccharide syrup can be produced with lignans, ferulic acid and other antioxidants and is extremely soluble and hygroscopic.

It has a high potential in the drinks industry as it has low viscosity, is a good source of dietary fibre and gives good mouth feel and texture.

In combination with glucose syrup it could be used as a sweetener and energy source for drinks, cereal bars etc. As it is rich in ferulic acid, pentosans and solubilised lignans, one can also claim the related health benefits. It is very important to supply lignans in the presence of pentosan oligomers if the full cancer prevention effect is to be expressed and realised: precisely the situation in this fraction.

The combination of glucose syrup and oligosaccharide syrup is also ideal in applications where one requires increased dietary fibre content and increased water binding capacity without thickening. Soluble oligosaccharide can also be used in confectionery formulations in combination with glucose or other sugar syrups and further concentrated to produce moisture stable products.

The oligosaccharide syrup is the low molecular weight fraction of the solubilised arabinoxylans along with other low molecular weight components solubilised from the cell wall. This includes dissolved lignin fragments, phenolic compounds such as ferulic acid and lignans. As with the insoluble dietary fibre, the presence of lignans with arabinoxylan gives rise to claims for cancer preventative roles for rye and wheat derived fractions. In this case, the arabinoxylans are present as oligomers and the lignans are very available in the syrup with a potential high accessibility for the gut. This should increase the rate of conversion of the plant lignans to enterolactone with a potentially larger impact on cancer prevention.

Furthermore, the presence of high concentrations of oligomeric arabinoxylan provides a ready fermentation substrate for the production of beneficial SCFAs such as butyrate, with benefits as described for the hemicellulose fraction.

This fraction, especially in the case of rye, is probably the most interesting in the present context being an excellent source of arabinoxylans, lignans and phenolic antioxidants in very accessible forms along with relevant synergistic partner compounds. In oat and barley, it is a good source of low molecular weight beta-glucan fragments.

Germ Oil

The germ oil is derived from the germ rich protein and is a high quality food grade oil and ingredient. It can be extracted without using any solvent, and it contains no preservatives or additives. It is a good source of poly and mono unsaturated fat, has a good flavour, is rich in vitamin E and can be suspended easily. As a flavouring component it is good in wheat or rye based products (cereals, baking goods, biscuits etc), deserts, ice creams etc. It can also be useful as an ingredient in fat and oil formulations, juices etc. with natural vitamin E.

Rye germ oil is particularly rich in naturally occurring β-sitosterol, a cholesterol lowering compound and tocotrienol, a cholesterol "burner". These materials can be classified as "natural synergistic partners", an important factor in the functional food area. This massively increases the potential of the oil as a value-added neutraceutical ingredient in foods such as margarines and spreads.

Germ oil is also a good UV blocker and therefore together with ferulic acid it can be ideal as a component of a sun tan lotion. Its emulsifying properties make it very suitable as an emulsion stabilizer and as an emollient ingredient for skin creams.

Defatted Protein Fractions

This is the protein that remains after the oil has been extracted from full fat germ- and aleurone-rich fractions and has at least 60% protein content. It is also a good functional protein, has an extremely high fat binding capacity and can be easily upgraded enzymatically to increase solubility, emulsion and foam stabilisation properties.

The product is an excellent stabiliser for water in oil emulsions and is interesting as a meat texturiser or extender in sausages, burgers, patées etc. The defatted protein fraction is a functional protein that can easily replace soya proteins and contains phospholipids, natural lecithins and glycolipids.

It has a high potential in cosmetic formulation as an emulsion stabiliser because it contains natural lecithins.

Figure 2:
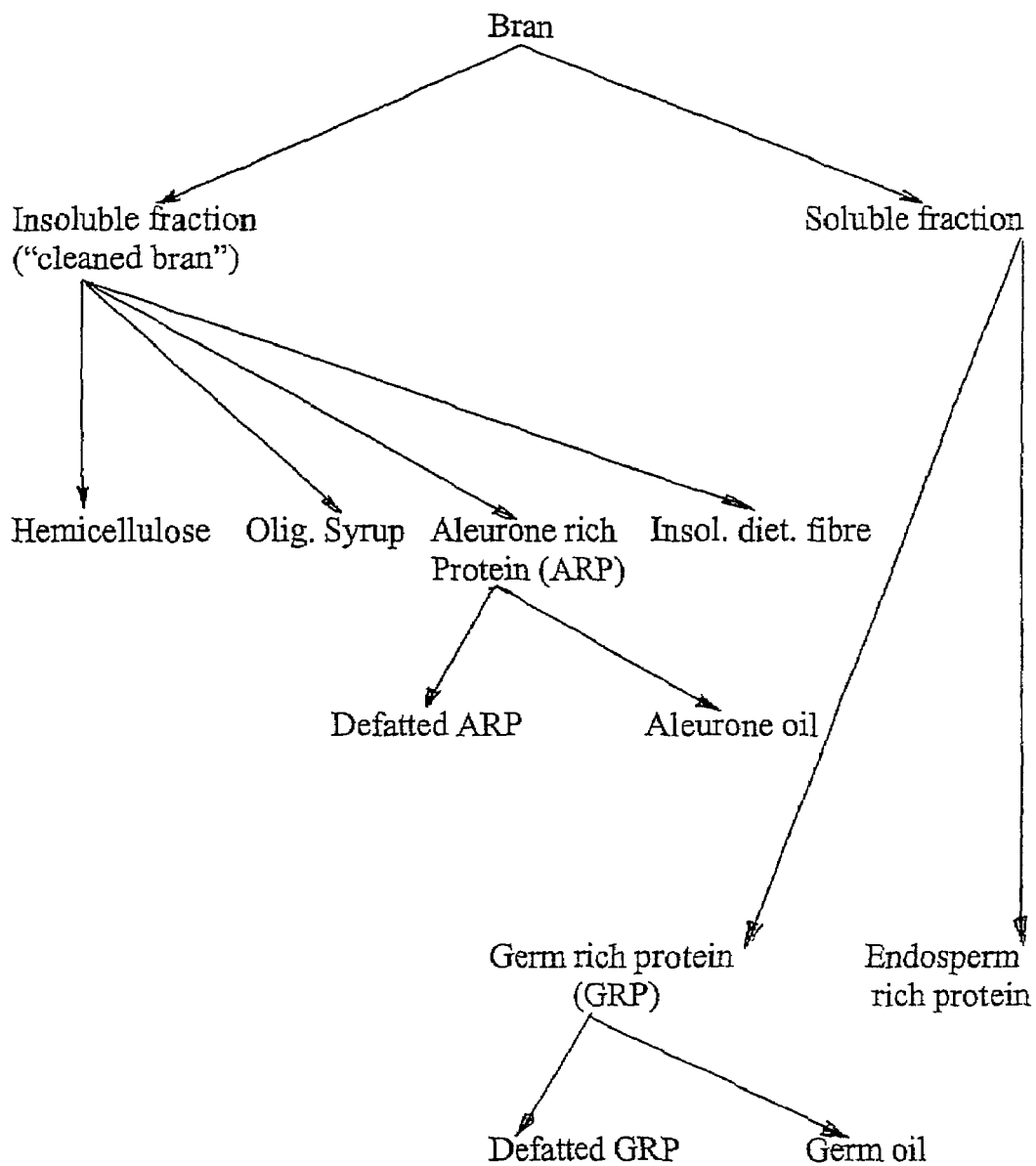
FIG. 2 shows the fractionation of the cereal bran in an over-view.

One preferred embodiment of a plant for carrying out the invention on cereal bran is shown in the attached drawing, wherein FIG. 1 shows a set-up for carrying out a preferred embodiment of the invention; and FIG. 2 shows the fractionation of the cereal bran in an over-view.

One preferred embodiment of a plant for carrying out the invention related to separation of cereal bran or cleaned cereal bran is shown in the attached drawing, FIG. 1 wherein 1 denotes a suspension and hydrolysis vessel to which a wet mill 2 is connected. The reaction mixture is intermittently pumped through the wet mill 2 (from 1 to 3 times). The hydrolyzate is then optionally inactivated in a heat exchange 3 and transferred to a two-phase decanter 4, which decanter 4 separates the insoluble (insoluble fibre) from the soluble phase. The insoluble phase having a dry matter content of about 35% is dried to approximately 95% dry matter in a ring drier 5. The soluble phase, having a dry matter content of approximately 3%, is pumped through another two-phase decanter 7, or optionally a separator, via a holding tank 6, in which two-phase decanter 7 protein-rich fraction is separated off. The protein-rich fraction is optionally enzymatically treated for improved functionality in hydrolysis vessel 8, and then dried to about 95% dry matter in spray drier 9. The soluble (liquid) phase from the two-phase decanter 7, having a dry matter content of approximately 3%, is allowed to pass an ultra filter 10 having a molecular cut between 20 and 100 kD, preferably between 20 and 50 kD, which will depend on different product requirements. The retentate (fraction retained in the ultrafilter) from ultrafilter 10 is optionally enzymatically treated for improved functionality in hydrolysis vessel 11, and then dried to about 95% dry matter in spray drier 12 or optionally evaporated to a syrup concentration of at least 75% solids in an evaporator. The permeate fraction (not retained in the ultrafilter) from ultrafilter 10 is preferably evaporated to a syrup concentration of at least 75% solids in an evaporator 13.

What is claimed is:

1. A process for the wet fractionation of cereal bran obtained after a primary milling of one or more of the cereals of the group comprising wheat, barley, oat, rye and triticale resulting in the substantial removal of the endosperm, into protein, sugar and insoluble fractions, a process wherein bran substantially devoid of the endosperm is subjected to a first enzymatic treatment, utilizing a combination of enzymes of the group containing starch-hydrolysing enzymes, and aqueous wet milling, followed by a separating step whereby resultant aqueous slurry/suspension is separated into an insoluble fibrous fraction and a soluble fraction, whereby said soluble fraction is further separated by centrifugal forces into a germ-rich fraction and an endosperm- and sugar-rich fraction, said endosperm- and sugar-rich fraction is further separated into proteins and sugars and;

said insoluble fibrous fraction containing a cleaned bran consisting of both insoluble pericap and aleurone fractions, is further subjected to a hydrolyzation by a second enzymatic treatment utilizing a combination of one or a mixture of enzymes of the group non-starch polysaceharidases, and aqueous wet-milling, and a subsequent step whereby the resultant hydrolysate is separated into an insoluble phase and a soluble phase.

2. A process according to claim 1, wherein the first enzymatic treatment is accomplished using a starch degrading enzyme of the groups amylases and amyloglucosidases.

3. A process according to claim 1, wherein the second enzymatic treatment is carried out using at least one non-starch degrading polysaccharidase in the form of cellulases, hemicellulases mainly xylanases, beta-glucanases, and pectinases, and/or phytases.

4. A process according to claim 1, wherein the insoluble phase obtained from the hydrolysate and containing primarily insoluble fibers, of the group comprising cellulose, lignin, less accessible hemicellulose, residual aleurone cells and cell wall bound proteins is spray dried, and;

the soluble phase obtained from the hydrolysate containing soluble hemicellulose, oligosaccharides, sugars and proteins, and said soluble phase is further separated into a heavy phase containing mainly aleurone cell protein and a light phase containing hemicellulose in the form of soluble hemicellulose and oligosaccharides, and;

said light phase is further separated by size exclusion technique into soluble hemicellulose (medium molecular size fraction) and oligosaccharides mixed with sugars (small molecular size fraction).

5. A process according to claim 1, wherein cleaned bran is cereal bran substantially free of both in water or less polar solvents soluble compounds, derived from wheat, barley, oat, rye or triticale.

6. A process according to claim 1, wherein the combination of intermittent wet milling with enzymatic treatment is arranged to increase the rate of enzymatic hydrolysis of the substrate thereby improving the overall hydrolysis performance and the subsequent separation of the various fractions by density/solubility and molecular size.

7. A process according to claim 3, wherein the second enzymatic treatment is accomplished using xylanases with high beta 1-4-xylanase (pentosanase) and/or beta-glucanase activity.

8. A process according to claim 1, wherein the first enzymatic treatment is carried out for less than 3 hours at a pH of 4 to 7.5, at a temperature from 50 to 90° C., and at an enzymatic activity of at least 1 IU/g of substrate.

9. A process according to claim 1, wherein the second enzymatic treatment is carried out for less than 3 hours at a pH of 4 to 7, at a temperature from 35 to 80° C., and at an enzymatic activity of at least 1 IU/g of substrate.

10. A process according to claim 8, wherein the first enzymatic treatment is carried out for less than 3 hours at a pH of 4.5 to 7 and at a temperature from 50 to 75° C., at an enzymatic activity of at least 200 to 1500 IU/g of substrate.

11. A process according to claim 9, wherein the first enzymatic treatment is carried out for less than 3 hours at a pH of 4.5 to 5.5 and at a temperature from 40 to 50° C., at an enzymatic activity of at least 200 to 1500 IU/g of substrate.

12. A process according to claim 1, wherein the first enzymatic treatment and aqueous wet milling is followed by an enzyme inactivation by wet heat treatment.

13. A process according to claim 1, wherein the second enzymatic treatment and aqueous wet milling is followed by an enzyme inactivation by wet heat treatment.

* * * * *